United States Patent Office 3,056,818
Patented Oct. 2, 1962

3,056,818
TITANIUM AND ZIRCONIUM ESTERIFICATION CATALYSTS
Frank X. Werber, North Royalton, Ohio, assignor to The B. F. Goodrich Company, New York, N.Y., a corporation of New York
No Drawing. Filed Oct. 13, 1955, Ser. No. 540,342
20 Claims. (Cl. 260—410.6)

This invention relates to a method for preparing esters in the presence of an organo-titanium or organo-zirconium catalyst and more particularly pertains to a method for preparing esters of carboxylic acids and primary or secondary alcohols, in liquid phase, in the presence of an organo-titanium or organo-zirconium compound having at least one organic group which can be an alkoxyl group, an acyl group, an alkoxy alkanol, an alkoxytertiary amino group or an aromatic hydrocarbon group attached to the titanium or zirconium atom through an oxygen atom.

The titanium and zirconium catalysts are titanium or zirconium esters, titanium acylates and titanium chelates. These compounds have the generic structure $MX_4$ in which M is titanium or zirconium, and X is selected from the class consisting of hydroxyl, alkoxy, acyloxy hydroxyalkoxy, and aminoalkoxy groups and halogen atoms selected from the class consisting of chlorine and bromine at least one X being an organic radical, as defined above. The hydrocarbon residue of the acyloxy groups can be an unsubstituted aliphatic group having from 2 to 8 carbon atoms. Chlorine and bromine can also be defined as halogen atoms having atomic weights from 35.457 to 79.916 as disclosed in the International Atomic Weight Tables of 1952.

An object of the invention is the provision of a method for preparing esters of carboxylic acids, and primary or secondary alcohols, in liquid phase, in the presence of an organo-titanium catalyst, or organo-zirconium as defined above, or mixtures of such catalysts.

Another object is the provision of a method for preparing esters of carboxylic acids and primary or secondary alcohols, in liquid phase, in the presence of titanium and zirconium esters of aliphatic alcohols or phenols, titanium or zirconium chelates of polyalkanols or alkanol amines or mixtures of said organo-titanium and organo-zirconium compounds.

These and numerous other objects are accomplished by the addition of at least one organo-titanium or organo-zirconium compound having the formula $MX_4$, in which, M and X have the same designation as above, to a mixture of a carboxylic acid or an anhydride thereof and a primary or secondary alcohol, carrying out the reaction in liquid phase, and removing the water of esterification as it is formed. In this manner very good yields of ester are formed in relatively short periods of time with only a very slight amount of dehydration of the alcohols. This latter effect is particularly important in the esterification of secondary alcohols at elevated temperatures. An additional advantage of this preparation of esters by the method of this invention is that no strongly acid ingredient is present. Thus, if the esters are to be used as plasticizing agents for acid sensitive plastics, such as polyvinyl chloride, there is no need of purifying the ester, since the titanium compounds have no deleterious effect on the polyvinyl chloride and, under most conditions, actually act as stabilizers.

The effectiveness of the titanium and zirconium esters, phenolates, acylates and chelates as esterification catalysts is quite unexpected, as it is known that all these organo-titanium compounds are hydrolyzed by water even at room temperature at varying rates. The titanium and zirconium alcoholates, or esters which show great susceptibility to hydrolysis in the presence of water are among the most effective organo-titanium esterification catalysts. The titanium tetraacylate and the titanium chelates are less susceptible to hydrolysis than the alcoholates but they are decomposed by water in a few hours. If both acyl and alcohol groups are attached to the same titanium atom, the alcohol groups are readily hydrolyzed by water, while the acyl groups have about their usual stability to water. Thus, it is apparent that stability of the original organo-titanium compound is not necessarily determinative of its catalytic activity.

Typical titanium esters which can be used as catalysts include tetramethyl titanate, tetraethyl titanate, tetrapropyl titanate, tetraisopropyl titanate, tetrabutyl titanates, tetrapentyl titanates, tetrahexyl titanates, tetraoctyl titanates, tetranonyl titanates, tetradodecyl titanates, tetrahexadecyl titanates, tetraoctadecyl titanates, and tetraphenyl titanate. The alkoxy groups on the titanium atom can all be the same or they can be different. The zirconium counterparts of the above esters can be substituted in whole or in part as catalysts.

The titanium esters (alkoxides and phenoxides) can be prepared by reacting a titanium halide such as $TiCl_4$ or $TiBr_4$ with alcohols in the presence of pyridine or other amines. Mixed alkyl titanates can be prepared by reacting a mixture of alcohols with titanium tetrachloride, or a mono- or dialkyl titano halide can be reacted with an alcohol having a hydrocarbon group other than that already present on the titanium molecule. For example, titanium tetrachloride reacts readily with alcohols by substitution of two alkoxy groups for two halogen atoms. The partially reacted alkyl chlorotitanate can thereafter be reacted with a second alcohol in the presence of an amine to substitute two additional alkoxy groups for the remaining halogen atoms on the titanium atom. The partially reacted titanium halides which are termed alkyl halotitanates are also esterification catalysts.

The titanium acylates which serve as esterification catalysts are polymeric material having at least one acyl group for each titanium atom. Structurally they can be represented by the formula

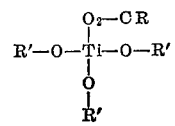

in which R is an alkyl or aryl group, R' is an alkyl group, an aryl group, an acyl group or hydrogen and the compound can have from 1 to 4 acyl groups. They are further characterized by their solubility in hydrocarbons.

Typical titanium acylates which can be employed as catalysts include acylates from 2 to about 18 carbon atoms, such as hydroxy titanium acetate, hydroxy titanium butyrate, hydroxy titanium pentanoate, hydroxy titanium hexanoate, hydroxy titanium octanoate, hydroxy titanium decanoate, hydroxy titanium dodecanoate, hydroxy titanium tetradecanoate, hydroxy titanium hexadecanoate, hydroxy titanium octadecanoate, hydroxy titanium oleate, hydroxy titanium soya acylate, hydroxy titanium linseed acylate, hydroxy titanium castor acylate, hydroxy titanium tall oil acylate, hydroxy titanium cocoanut acylate, methoxy titanium acetate, ethoxy titanium butyrate, isopropoxy titanium pentanoate, butoxy titanium hexanoate, isopropoxy titanium octanoate, isopropoxy titanium decanoate, isopropoxy titanium dodecanoate, isopropxy titanium tetradecanoate, isopropoxy hexadecanoate, isopropoxy octadecanoate, isopropoxy titanium oleate, isopropoxy titanium soya acylate, isopropoxy linseed acylate, isopropoxy castor acylate, isopropoxy tall oil acylate, and isopropoxy cocoanut acylate. The alkoxy group of the acylate can vary from 1 to about 20 carbon atoms. The corresponding zirconium acylates can be used as catalysts.

The alkoxy titanium and zirconium acylates hydrolyze rapidly in the presence of water to form the corresponding hydroxy titanium acylates, they also undergo alcoholysis reactions whereby the alkoxy group of the acylate is replaced by another alcohol molecule.

Titanium chelates are formed by reacting a titanium compound with a polyfunctional molecule including polyols such as glycols or glycerine and amino alcohols, amino acids, hydroxy acids and polycarboxylic acids.

The organo-titanium chelates have two or more chelate groups per titanium atom. The general structure of chelates made from a glycol is believed to be

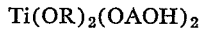

in which R is an alkyl radical and A is an alkyl group or the residue of a polyalkylene glycol. The titanium is thus connected to the oxygen of the free hydroxyl group by secondary valence bonds. Chelates of this type need not have an OR group as defined above, since all four groups attached to the titanium can be chelating groups, in which even two of the free hydroxyl groups will be bound to the titanium by secondary valence bonds and the remaining hydroxyl groups will not be chelated.

Amino alcohols form chelates with titanium in which two or more moles of chelating compound are present per titanium atom. These compounds can be represented by the formula

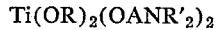

wherein R is an alkyl radical, A is an alkyl radical and R' is hydrogen or an alkyl radical. The nitrogen atoms of the amino group are connected to the titanium by secondary valences. As in the glycol chelates, the alkoxy groups can be replaced by amino alcohol groups, so that the chelate compound can have 2, 3 or 4 amino alcohol groups per titanium atom.

Typical chelated esters which serve as catalysts include tetraethylene glycol titanate, tetrapropylene glycol titanate, tetrabutylene glycol titanate, tetraoctylene glycol titanate and tetrapolyethylene glycol titanate, dibutoxy di-(ethylene glycol) titanate, diisopropoxy di-(octylene glycol) titanates, dimethoxy, di-(octylene glycol) titanates, diethoxy di-(octylene glycol) titanates, tetratriethanol amine titanate, tetratriethanol amine-N-oleate, triethanol amine-N-stearate, triethanol amine-N-linseed acid salt, dibutoxy, dipropoxy, dimethoxy, diethoxy, and other dialkoxy di-(amino alcohol) titanates. The corresponding zirconium chelates are also useful as catalysts.

The concentration of organo-titanium or zirconium catalyst employed can be varied over a fairly wide range. Small amounts such as 0.01 percent by weight of esterifiable acid can be employed and amounts of 1.0, 2.0, 5.0, and even 10.0% or higher can be employed, although there is little advantage in using amounts greater than 1% based on the weight of the acid esterified.

Any mono or polycarboxylic acid and anhydrides thereof can be esterified above or in mixture with the catalysts. Thus, the acids undergoing esterification can be aliphatic, cycloaliphatic or aromatic and they can be substituted or unsubstituted. Representative acids include acetic, hydroacetic, chloroacetic, bromoacetic, cyanoacetic, phenylacetic, triphenyl acetic, propionic, halopropionic, lactic, beta-hydroxy propionic, n-butyric, isobutyric, n-valeric, isovaleric, 5-phenyl-n-valeric, n-heptoic, caproic, pelargonic, lauric, palmitic, lignoceric, alpha-hydroxy lignoceric, malonic, succinic, glutaric, adipic, pimelic, azelaic, sebacic, decane-1,10-dicarboxylic, pentadecane-1,15-dicarboxylic, pentacosane-1,25-dicarboxylic, 1,2,3-propane tricarboxylic, citric, acrylic, alpha-chloro acrylic, beta-chloro acrylic, beta-bromo acrylic, beta-phenyl acrylic, methacrylic, vinyl acetic, crotonic, angelic, tiglic, undecylenic, oleic, erucic, linoleic, linolenic, maleic, fumaric, mesaconic, citraconic, itaconic, mucconic and aconitic.

Among the alicyclic acids are cyclopropane carboxylic, cyclobutane carboxylic, cyclopentane carboxylic, cycloheptane carboxylic, cyclohexane carboxylic, 2-hydroxy cyclohexane carboxylic, 1,1-cyclopropane dicarboxylic, 1,2-cyclobutane dicarboxylic, 1,3-cyclobutane dicarboxylic, 1,4-cyclohexane dicarboxylic, cyclohexane-1,2,3,4,5,6-hexacarboxylic, cyclopentene-2-carboxylic, 1-cyclohexene-1-carboxylic, hydrocapric, cyclohexadiene-1,2-dicarboxylic, and 1,3-cyclohexadiene-1,4-dicarboxylic.

The aromatic acids include benzoic, o, m and p-chloro and bromo benzoic, o, m and p-hydroxy benzoic, o, m and p-nitrobenzoic, o, m and p-methoxy benzoic, alpha-napthoic, beta-naphthoic, o, m and p-methyl benzoic, o, m and p-ethyl benzoic, p-phenyl benzoic, phthalic, isophthalic, terephthalic, hydroxy phthalic, 2,3-dimethyl benzoic, benzene-1,2,4-tricarboxylic, benzene-1,3,5-tricarboxylic, benzene-1,2,4,5-tetracarboxylic and mellitic.

Anhydrides of mono and dibasic acids can be used in place of the acids. These include acetic anhydride, propionic anhydride, n-butyric anhydride, succinic anhydride, glutaric anhydride, adipic anhydride, pimelic anhydride, maleic anhydride, mesaconic anhydride, citraconic anhydride, glutaconic anhydride, itaconic anhydride, phthalic anhydride, benzoic anhydride and mixed anhydrides of monobasic acids.

Among the alcohols which can be reacted with carboxylic acids and anhydrides are included, by way of example methanol, ethanol, chloroethanol, cyanoethanol, ethoxyethanol, phenylethanol, n-propanol, 2-chloropropanol-1,3-bromo-propanol-1, 2,2-dichloropropanol-1, isopropanol, n-butanol, secondary butanol, 2-nitropropanol-1, 1-chloropropanol-2, 2-nitrobutanol-1, 2-methyl pentanol-1, 2-methyl pentanol-3, the primary and secondary octanols, n-dodecanol, 6-dodecanol, lauryl, myristyl, stearyl, 2-propenol-1, 2-butenol-1, 3-pentenol-1, ethylene glycol, trimethylene glycol, tetramethylene glycol, pentamethylene glycol, glycerol, 1,4-butanediol, pentaerythritol, decane-1, 10-diol, pentadecane-1,15-diol, pentacosane-1,25-diol, 2, 4-hexadiene-1,6-diol, 2,4-octadiene-1,8-diol, benzyl alcohol, o, m and p-methoxy alcohol, o, m and p-nitrobenzyl alcohol, o, m and p-methyl benzyl alcohol, phenyl ethyl alcohol, triphenyl ethyl alcohol, o, m and p-benzyl benzyl alcohol, alpha-naphthyl-ethyl alcohol, beta-naphthyl ethyl alcohol, naphthylene-1,2-diethyl alcohol, phenylene-1,3,5-triethyl alcohol, and phenylene-1,4-dioctyl alcohols.

The catalysts of this invention are particularly useful for esterifying secondary alcohols because dehydration of the alcohol under esterifying conditions is extremely low. Thus, complete esterification of a carboxylic acid can be obtained with only a slight excess of the secondary alcohol.

The reaction conditions under which esterification is effected can be varied considerably. The reaction proceeds very slowly at room temperature, but at elevated temperatures, preferably under reflux, the reaction rate is quite rapid, so that about 99% of the acid is converted to ester within a few hours. To facilitate the completion of the reaction the water of esterification is removed substantially as rapidly as it forms. This can be accomplished by carrying out the reaction in a liquid medium which forms an azeotrope having a boiling point that is lower than that of either component of the reaction. It is to be understood, however, that if the reactants and the ester which results boil at temperatures well above 100° C. at atmospheric pressure, the reaction temperature can be sufficiently high to require no azeotrope forming liquid reaction medium.

The reaction can be carried out under reduced or superimposed pressures, so long as the reactants remain liquid.

The examples which follow are intended to be illustrative of the invention and are not to be considered as limitations thereon. All parts are by weight unless otherwise indicated.

EXAMPLE I

One mole of phthalic anhydride was reacted with an excess of 2-ethyl hexanol (3 moles) in the presence of 2 grams of tetraisopropyl titanate at reflux temperature. The reaction equipment was fitted with a stirrer, a thermometer and a Jansen-type water separation head filled with 2-ethyl hexanol. In five minutes 20.7% of the acid was esterified. After 38 minutes 91.1% of the acid was converted to ester and after only 93 minutes 99.7% of the acid was esterified.

EXAMPLE II

A polyester was made by reacting a mixture of adipic and lauric acids with butanediol-1,3.

A reaction mixture of 15 moles of adipic acid, 0.9 mole of lauric acid, 18.75 moles of butanediol-1,3 and 7.5 grams of tetraisoproypl titanate was prepared. A steam-heated fractionating column, packed with Berl saddles, was connected to the reaction kettle. A slow stream of nitrogen was allowed to flow through the reaction mixture which was heated to a temperature of 195° C. at atmospheric pressure. Elimination of water started when the temperature reached about 140° C. In the first 45 minutes 475 ml. of water were collected. At this stage the temperature was reduced to 165° C. and the pressure was slowly reduced to 200 mm. Heating was resumed and pressure was gradually reduced to 100 mm. A reaction temperature of 206° C. was reached within another 45 minutes and the temperature was held for an additional hour. During this period a mixture of water containing a small amount of diol was collected in the trap. The acid number of the ester at this stage was 3.34.

The steam heated fractionating column was replaced with a short distillation head. The reaction mixture was heated to 200–205° C. at a pressure of 0.2 mm. with agitation. The conditions were maintained for one hour to remove all volatile ingredients. There remained 3050 parts of a viscous syrupy polyester which had the following properties:

Viscosity_____ 65,200 centipoises at 76° F.
Acid number_____ 0.22.
Percent free hydroxyl_____ 0.38.

EXAMPLE III

Another polyester was prepared by reacting 1 mole of phthalic anhydride, 1.5 moles of pelargonic acid, 0.2 mole of n-butanol and 1 mole of butanediol-1,3 in the presence of 2 grams of tetraisopropyl titanate. The reaction was carried out in a flask fitted with a thermometer and a fractionating column packed with Berl saddles. The column had a water separation head filled with butanol. The mixture was heated to reflux temperature for 11 hours during which time the temperature rose from 148° C. to 209° C. At this point the acid number of the reaction mixture was 0.34.

EXAMPLE IV

A reaction mixture of one mole of adipic acid, 2 moles of palmitic acid, 3 moles of butanediol-1,3 and 2 grams of tetraisopropyl titanate was heated first at atmospheric pressure and then at a pressure of 100 mm. for about 3 hours at a temperature of 205° C. in a flask fitted with a thermometer, a steam-heated fractionating column packed with Berl saddles, and a nitrogen sparge. The reaction mixture was then stripped of glycol by reducing the pressure to 2.5 mm. and maintaining the temperature at 200° C. for 30 minutes. Volatile esters were stripped by maintaining the mixture at 200° C. and a pressure of 0.1 mm. for 3½ hours. The residual polyester had an acid number of 0.1 and a saponification number of 292. If terephthalic acid and ethylene glycol are reacted in the presence of the titanate catalyst a high molecular weight, high melting solid polyester is formed.

EXAMPLE V

A reaction mixture of one mole of phthalic anhydride, 3 moles of 2-ethyl hexanol and 2 grams of tetraisopropyl titanate was heated under reflux in the apparatus described above. The water of esterification was removed substantially as rapidly as it formed. After 38 minutes the phthalic anhydride was 91.1% esterified and at the end of about 93 minutes the esterification of the carboxyl groups was 99.8%.

In another reaction using one mole of phthalic anhydride, one mole of 2-ethyl hexanol and 2 grams of tetraisopropyl titanate, the monoester was formed in about 15 minutes to the substantial exclusion of diester.

EXAMPLES VI–XI

In the following examples various organo-titanium esterification catalysts were added in catalytically effective amounts to a reaction mixture of one mole of phthalic anhydride and three moles of 2-ethyl hexanol. The type of catalyst, the amount used and the time required for 99% esterification are tabulated below:

*Table I*

| Catalyst | Amount (grams) | Time in hours to 99% esterification |
| --- | --- | --- |
| VI. Tetraphenyl titanate | 3.0 | 2.7 |
| VII. Tetrastearyl titanate | 4.0 | 3.0 |
| VIII. Octylene glycol titanate | 2.8 | 4.0 |
| IX. Triethanolamine titanate | 3.5 | 3.0 |
| X. Hydroxy titanium stearate | 2.7 | 2.4 |
| XI. Hydroxy titanium cocoanut acylate | 2.2 | 2.1 |
| Uncatalyzed control | | 19 |

EXAMPLE XII

The organo-titanium esterification catalysts are especially useful in preparing esters with secondary alcohols, in which reactions there is remarkably little dehydration of the alcohols.

A reaction mixture of one mole of phthalic anhydride, 3 moles of octanol-2 and 2 grams of tetraisopropyl titanate was heated at reflux temperature and atmospheric pressure. The diesterification of phthalic acid was 99% complete after 6½ hours. During this period only 5% of the excess alcohol was dehydrated. When no catalyst was used with the same ratio of anhydride and octanol-2 the esterification reached 90% in 37 hours but 10% of the excess octanol-2 was dehydrated, but if p-toluene sulfonic acid is substituted for the tetraisopropyl titanate as a catalyst the esterification was 93% complete in 6 hours and 92% of the excess octanol-2 was dehydrated.

EXAMPLE XIII

A reaction mixture containing one mole of phthalic anhydride, 3 moles of 2-ethylhexanol and 2 grams of tetraethyl zirconate was heated to reflux in the apparatus described heretofore. In about one hour 53.3% of the carboxyl groups were esterified. At the end of 1½ hours about 70% of the carboxyl groups were converted to ester and at the end of 3 hours 99.2% of the carboxyl groups were esterified.

Other zirconate esters, acylates, or chelates can be used in place of tetraethyl zirconate as esterification catalysts. As with the titanates, secondary alcohols are dehydrated only slightly during the esterification in the presence of the zirconium containing catalyst.

EXAMPLE XIV

A reaction mixture of 130 parts of phthalic anhydride, 390 parts of 2-ethylhexanol and 2.73 parts of

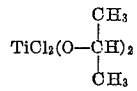

was prepared and heated to reflux. Water was removed by entrapment substantially as rapidly as it formed. The reaction temperature which was about 160° C. at the beginning gradually increased to about 210° C. as the esterification progressed. After 5 hours about 92% of the esterification was effected and at 7 hours the esterification was substantially complete.

In place of $TiCl_2(OC_3H_7)_2$ other titanium dichlorodialkanoates or titanium dibromodialkanoates in which the alkyl group contains from 1 to about 18 carbon atoms can be used as catalysts.

The monomeric esters can be employed as plasticizers without purification. The polyesters which are formed by reacting polyfunctional acids with polyols can be hydroxy-terminated, carboxy terminated or substantially neutral, and they can be liquid or resinous solids at room temperature. The resinous solids can be molded into articles or dissolved in volatile solvents and used as a water-proof coating material on cloth, paper, and metal. The hydroxy terminated liquid polyesters can be reacted with isocyanates to form elastomeric products, and the acid terminated liquids can be reacted further with polybasic alcohols to form solid resinous polyesters.

In a copending application Serial No. 540,341 filed jointly by me and S. Averill on October 13, 1955, the method of esterifying carboxylic acids and alcohols and transesterifying esters with alcohols by the use of hydrated titanium oxides and titanium halides is described.

Although I have described my invention by specific illustrations it will be apparent that there are possible variations in the reaction ingredients, their proportions and the conditions under which they are reacted. Therefore, the specific examples should be considered only as procedural illustrations and not as limitations on the invention, except as defined in the claims.

I claim:

1. A method of preparing esters comprising reacting at an elevated temperature in liquid phase (1) a member selected from the class consisting of carboxylic acids and carboxylic anhydrides with (2) aliphatic primary and secondary alcohols, said acids, anhydrides and alcohols containing only carbon, hydrogen and oxygen, in the presence of from about .01 to about 10 weight percent based on (1) of a compound having the generic structure $MX_4$ in which M is selected from the class consisting of titanium and zirconium and X is selected from the class consisting of hydroxyl groups, alkoxy groups, acyloxy groups, hydroxy alkoxy groups, amino-alkoxy groups and halogen atoms having atomic weights from 35.457 to 79.916 inclusive, at least one X being an organic radical as defined above and having from 2 to 18 carbon atoms, and removing the water of esterification from the reaction substantially as rapidly as it is formed.

2. The method of claim 1 in which the catalyst concentration ranges from 0.01 to about 10% by weight based on said acids and anhydride, the alcohols are saturated and the catalyst is a titanate ester of an alcohol having from 2 to 18 carbon atoms.

3. A method of preparing esters comprising reacting at an elevated temperature in liquid phase (1) a member selected from the class consisting of carboxylic acids and carboxylic anhydrides with (2) saturated primary and secondary aliphatic alcohols, said acids, anhydrides and alcohols containing only carbon, hydrogen and oxygen, in the presence of from 0.01 to 10% by weight based on (1) of hydroxy titanium cocoanut acylate and removing the water of esterification substantially as rapidly as it is formed.

4. A method of preparing esters comprising reacting at an elevated temperature in liquid phase (1) a member selected from the class consisting of carboxylic acids and carboxylic anhydrides with (2) saturated primary and secondary aliphatic alcohols, said acids, anhydrides and alcohols containing only carbon, hydrogen and oxygen, in the presence of from 0.01 to 10% by weight based on (1) of tetrapropyl titanate and removing the water of esterification from the reaction substantially as rapidly as it is formed.

5. A method of producing polyesters by direct esterification of a compound selected from the group consisting of aliphatic and aromatic dicarboxylic acids with a saturated dihydric alcohol in the presence of a catalytic quantity of a compound of the structure $MX_4$ wherein M is selected from the group consisting of titanium and zirconium and X is selected from the group consisting of hydroxyl groups, alkoxy groups, acyloxy groups and chloride groups wherein at least one X is an organic radical as defined above.

6. A method of producing esters by direct esterification of a compound selected from the group consisting of aromatic and aliphatic carboxylic acids and anhydrides thereof with a saturated aliphatic alcohol in the presence of a catalytic quantity of a tetraalkyl titanate.

7. A method of producing polyesters by direct esterification of a compound selected from the group consisting of aliphatic and aromatic dicarboxylic acids with a saturated dihydric alcohol in the presence of a catalytic quantity of a tetraalkyl titanate.

8. A method of preparing esters comprising reacting at an elevated temperature in liquid phase (1) a member selected from the class consisting of carboxylic acids and carboxylic anhydrides with (2) aliphatic primary and secondary alcohols, said acids, anhydrides and alcohols containing only carbon, hydrogen and oxygen, in the presence of a catalytic quantity of octylene glycol titanate and removing the water of esterification from the reaction substantially as rapidly as it is formed.

9. A method of preparing esters comprising reacting at an elevated temperature in liquid phase (1) a member selected from the class consisting of carboxylic acids and carboxylic anhydrides with (2) saturated primary and secondary aliphatic alcohols, said acids, anhydrides and alcohols containing only carbon, hydrogen and oxygen, in the presence of from .01 to 10% by weight based on (1) of triethanol amine titanate and removing the water of esterification substantially as rapidly as it is formed.

10. A method of preparing esters comprising reacting at an elevated temperature in liquid phase (1) a member selected from the class consisting of carboxylic acids and carboxylic anhydrides with (2) saturated primary and secondary aliphatic alcohols, said acids, anhydrides and alcohols containing only carbon, hydrogen and oxygen, in the presence of from .01 to 10% by weight based on (1) of hydroxy titanium stearate and removing the water of esterification substantially as rapidly as it is formed.

11. A method of preparing esters comprising reacting at an elevated temperature in liquid phase (1) a member selected from the class consisting of carboxylic acids and carboxylic anhydrides with (2) aliphatic primary and secondary alcohols, said acids, anhydrides and alcohols containing only carbon, hydrogen and oxygen, in the presence of a catalytic quantity of tetraphenyl titanate and removing the water of esterification from the reaction substantially as rapidly as it is formed.

12. A method of preparing esters comprising reacting at an elevated temperature in liquid phase (1) a member selected from the class consisting of carboxylic acids and carboxylic anhydrides with (2) aliphatic primary and secondary alcohols, said acids, anhydrides and alcohols containing only carbon, hydrogen and oxygen, in the presence of a catalytic quantity of tetrastearyl titanate and removing the water of esterification from the reaction substantially as rapidly as it is formed.

13. A method of preparing esters comprising reacting at an elevated temperature in liquid phase (1) a member selected from the class consisting of carboxylic acids and carboxylic anhydrides with (2) aliphatic primary and secondary alcohols, said acids, anhydrides and alcohols containing only carbon, hydrogen and oxygen, in the presence of a catalytic quantity of tetraethyl zirconate and removing the water of esterification from the reaction substantially as rapidly as it is formed.

14. A method of preparing esters comprising reacting phthalic anhydride and an excess of 2-ethyl hexanol in liquid phase at an elevated temperature in the presence of a catalytic amount of tetraisopropyl titanate until substantially all the acid is converted to the diester and removing the water of esterification substantially as rapidly as it is formed.

15. A method of preparing esters comprising reacting phthalic anhydride and an excess of octanol-2 in liquid phase at an elevated temperature in the presence of from about .01 to about 10 weight percent based on the anhydride of tetraisopropyl titanate until substantially all the acid is converted to the diester and removing the water of esterification substantially as rapidly as it is formed.

16. A method of preparing a polyester comprising reacting in liquid phase and at an elevated temperature a dibasic carboxylic acid with a dihydric alcohol said acid and alcohol containing only carbon, hydrogen and oxygen in the presence of from about .01 to about 10 weight percent based on the acid of tetraisopropyl titanate and removing the water of esterification substantially as rapidly as it is formed.

17. A method of preparing polyesters comprising reacting, in liquid phase and at an elevated temperature, an anhydride of a dibasic carboxylic acid with a dihydric alcohol said anhydride and alcohol containing only carbon, hydrogen and oxygen in the presence of from about .01 to about 10 weight percent based on said anhydride of tetraisopropyl titanate and removing the water of esterification substantially as rapidly as it is formed.

18. The method of claim 16 in which the carboxylic acid is adipic acid admixed with a small amount of lauric acid and the glycol is butandiol-1,3.

19. A method of preparing polyesters comprising reacting, in liquid phase and at an elevated temperature, a mixture of phthalic anhydride, pelargonic acid, butandiol-1,3 and n-butanol in the presence of from about .01 to about 10 weight percent based on the combined weight of acids of tetraisopropyl titanate, and removing the water of esterification substantially as rapidly as it is formed.

20. A method of preparing a polyester comprising reacting, in liquid phase and at an elevated temperature, a mixture of adipic acid, palmitic acid and butandiol-1,3 in the presence of from about .01 to about 10 weight percent based on the combined weight of acids of tetraisopropyl titanate and removing the water of esterification substantially as rapidly as it is formed.

References Cited in the file of this patent

UNITED STATES PATENTS

| | | |
|---|---|---|
| 2,621,193 | Langkammerer | Dec. 9, 1952 |
| 2,720,504 | Caldwell et al. | Oct. 11, 1955 |
| 2,727,881 | Caldwell et al. | Dec. 20, 1955 |
| 2,744,129 | Caldwell et al. | May 1, 1956 |

OTHER REFERENCES

Groggins: Unit Processes in Organic Synthesis, pp. 609, 618, McGraw-Hill (1952).